Aug. 2, 1938. W. W. HAASE Re. 20,816
SELF SEALING VAULT OR RECEPTACLE
Original Filed Nov. 14, 1927
Fig. 1
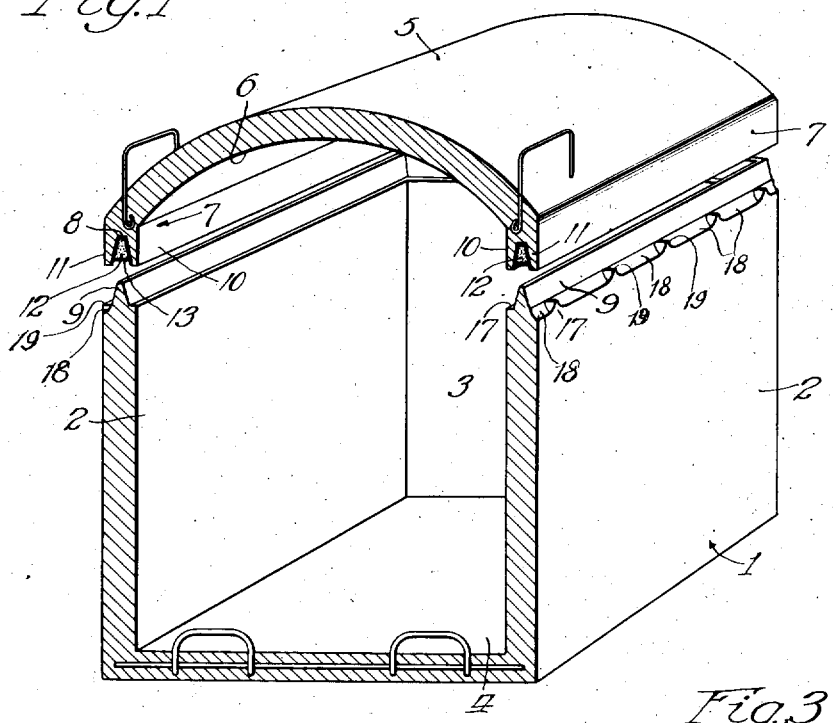
Fig. 4
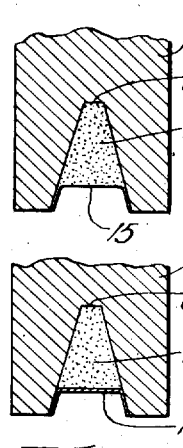
Fig. 2
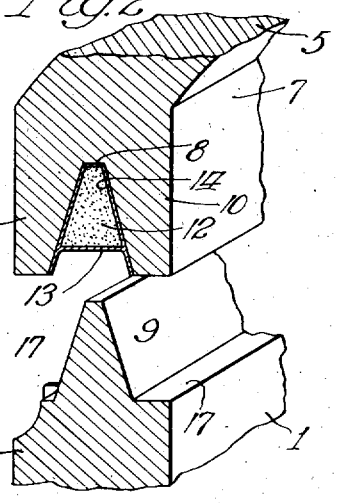
Fig. 3
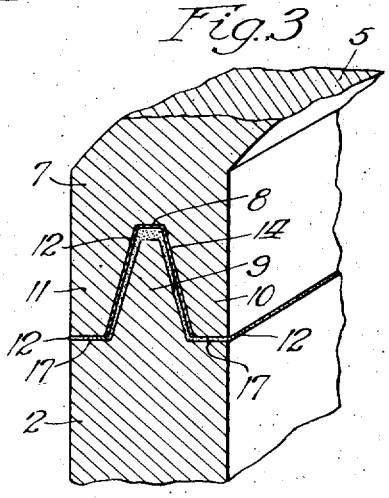
Fig. 5
Inventor
Gilbert W. Haase
By Harry Irwin Bromer,
Atty.

Reissued Aug. 2, 1938

Re. 20,816

UNITED STATES PATENT OFFICE 20,816

SELF-SEALING VAULT OR RECEPTACLE

Wilbert W. Haase, Forest Park, Ill., assignor to Wilbert W. Haase Co., Forest Park, Ill., a corporation of Illinois Original No. 1,722,744, dated July 30, 1929, Serial No. 233,113, November 14, 1927. Application for reissue March 21, 1938, Serial No. 198,225

3 Claims. (Cl. 72—7)

This invention relates to that class of self-sealing vaults or receptacles comprising a box body, and a cover member, one of said members having a marginal tongue, and the other of said members having a grooved marginal portion adapted to admit and engage such tongue, and to contain a filler of plastic material, or materials heated and introduced into the groove in a liquid and adhesive condition, and having a skin or covering spread over or integral with the filler material, and the outer surface of which covering when dried in relatively harder than the filler material within the groove and over the surface of which such covering is adapted to extend so as to tend to or temporarily hold the adhesive filler material in place within the groove, and until suitably conditioned by cooling and drying out to permit the spreading thereof between the grooved margin of the box cover and the tongue of the box body or receptacle upon the application of pressure incident to the entry of the tongue into the groove of the cover upon assembly and due to the weight of the cover.

The principal object of the invention is to provide a simple, economical and efficient self-sealing vault or receptacle comprising a box body member having a tongue in its upper margin, and a cover member having a groove adapted to admit such tongue, and adapted to contain a filler, and to be hermetically sealed by the spreading of such filler between the margins; the tongue being formed on the box body so that a minimum of flat surfaces will be formed upon which pebbles, dirt and other foreign matter might collect to interfere with the proper sealing of the vault and to eliminate recesses or pockets in which such materials may collect.

A further object of the invention is to provide such a device in which abutting horizontal surfaces are reduced to a minimum or in which the contour of some of the normally abutting surface is interrupted or varied so that expanding or gradually widening openings will be formed between the cover and body adjacent the tongue upon the assembly of the cover, into which some of the sealing material may be discharged or may flow to produce a wash over such remaining relatively flat surfaces as may be required to provide proper limiting stops, for removing obstructing materials such as may collect thereon and to provide a suitable discharge channel for such materials.

Other and further objects of the invention will appear from the following description and claims, and from an inspection of the accompanying drawing, which is made a part of this specification.

The invention consists in the features, combinations, and details of construction herein described and claimed.

In the accompanying drawing:—

Figure 1 is a view in perspective of a vault comprising a box body and cover formed of concrete, or equivalent material, showing said cover and box body in transverse vertical section and separated, as they would appear before placing the cover upon and in position to cover and close the box body, and before causing the normally plastic filler material to spread and hermetically seal the tongued and grooved margins of the cover and box body;

Fig. 2 is an enlarged detail view in vertical section showing the marginal portions, including the grooved bottom margin, and tongue and top margin of the cover and box body respectively, as they would appear before placing the cover in position upon the box body;

Fig. 3 is a similar view in detail, in vertical section, of the parts shown in Fig. 2, as they would appear with the cover in place upon and in position to close the box body, and with the normally plastic filler material spread between and acting to hermetically seal the united margins of the cover and box body;

Fig. 4 is an enlarged detail view in vertical section showing the grooved bottom margin of the cover provided with a filler of asphaltum spread into and in direct adhesive contact with the walls of the groove, and with the outer surface of the filler material sufficiently hardened by cooling and drying, to render the filler self-sustaining within the groove; and Fig. 5 is a similar view of a modification showing means for covering the normally plastic filler material within the groove.

In constructing a vault, or receptacle, in accordance with my invention and improvements, I provide a box body or main vault body member 1, comprising side walls 2, end walls 3, and bottom 4, and a vault cover 5.

The vault or box body is formed of or comprises by preference, concrete, containing sand or hydraulic Portland cement intermixed in suitable proportions, and formed or molded into the desired shape and dimensions while in a plastic condition, and then allowed to set and dry and harden.

The cover member 5 comprises a top wall or main cover portion 6, which is, by preference, arched, and provided with grooved bottom side and end margins or upright walls 7 which extend entirely around the bottom or rim of the cover.

The bottom side marginal portions or side walls of the cover are in parallel relation to and adapted to be secured in abutting engagement with the top margins of the side walls 2 of the box body; and the bottom end walls, or bottom end margins and upright end wall portions of the cover are in parallel relation to and adapted to be secured in abutting engagement with the upper margins of the limit stop portions of the corresponding upright end walls 3 of the box body. The cover member 5 is provided with a bottom marginal groove 8, which is, by preference, substantially in the form of an inverted V, in cross-section and extends entirely around the bottom margin or rim of the cover, or, in other words, along the bottom edge of the upright side and end walls or bottom marginal portions 7 of the cover, so as to form a continuous marginal bottom groove which opens downward throughout its entire length and throughout the entire bottom margin of the rim of the cover.

The box body 1 is provided with a continuous upwardly projecting top marginal tongue 9 which extends along and throughout the entire top marginal portions of the upright side walls 2 and end walls 3 of the box body, and is adapted to extend into and in interlapping engagement with the bottom groove 8 in the bottom margin of the cover.

The bottom marginal groove 8 in the cover is, by preference, tapered, or approximately V-shaped in cross-section, as already suggested, and is located between inner and outer marginal wall portions 10 and 11; and the endless upwardly projecting marginal tongue 9 on the upper margin or rim of the box body member is also, by preference, similarly tapered, and somewhat wider at its base than at its upper edge, and adapted to fit within the groove snugly, and sufficiently close to the walls of the groove to hold the cover accurately in proper fitting engagement with the box body, but with sufficient space between the tongue and the adjacent walls of the groove to admit and permit the proper spreading of suitable filler and sealing material between the tongue and groove.

A quantity of suitable filler and sealing material 12, which, by preference, consists of or comprises asphaltum, or a suitable composition containing asphaltum or equivalent water-proof sealing material, is introduced into the marginal groove 8 in the cover, while said filler or sealing material is in a liquid adhesive condition, and adapted to adhere tightly to the concrete which forms the walls of the groove, as well as to the tongue 9 on the top margin of the box body, when said tongue is introduced into the groove, so as to form a strong water-proof sealed connection between the grooved marginal portion or rim of the cover, and the tongue and top margin or rim of the box body, when the cover is placed upon and in position to close the latter.

For this purpose, I prefer to employ asphalt, or a bituminous compound or composition containing asphalt, which is introduced into the open bottom marginal groove or slot 8 in the bottom rim or margin of the cover, in a heated condition, and while sufficiently liquid to tightly adhere to the concrete walls of the slot or groove. A sufficient quantity of this bituminous filler and sealing material is thus introduced into the groove 8 while the cover 5 is inverted, to partially, and, by preference, almost entirely fill the groove.

In the form of the device shown in Figs. 1, 2 and 3, an inner coating of adhesive cementitious material 14 is applied to the inner walls of the groove or recess 8 in a liquid condition, before the required quantity of bituminous filler and sealing 12 is introduced. This coating or layer 14 of adhesive material may consist of or contain glue, or may consist of hydraulic cement, or composition containing bituminous cementitious material or asphalt, or other suitable adhesive material spread upon and in adhesive contact with the inner surfaces of the inner flange 10 and outer flange 11 which form the opposite side walls of the groove or recess 8, and the depending marginal rim or recessed depending marginal flange of the cover member. The filler 12 of bituminous or asphaltic material in a liquid condition may then be introduced into the recess or groove 8, and after cooling dries on the external surface to form a relatively hard skin 13 covering the inclosed more plastic material. An ideal consistency of the plastic material is such that it will be plastic only under pressure or when pressure is applied and when heated so that it may be applied after being heated to a liquid state and so that after cooling it will flow only under pressure due to the weight of the cover upon assembly thereof to the box.

I have found in practice, however, that, by providing a bituminous or asphaltic material or composition 12 of suitable normally plastic adhesive consistency, and introducing it into the groove 8 while warm and in the manner already described, but without first applying a coating 14 of adhesive material to the concrete walls of the groove, and then allowing the filler or bituminous composition 12 to dry and harden at its outer exposed surface, so as to form an outer coating or covering 15 which is integral with the filler 12 thus formed, the filler 12 with its integral outer or bottom exposed relatively strong and hardened, but sufficiently fragile coating or skin covering 15 in adhesive contact with the walls of said groove, is adapted to sustain itself within the groove even when relatively soft filling material is used and when the cover 5 is in upright position, and that the outer integral skin or covering 15, thus formed, is adapted to be automatically broken by the introduction of the tongue 9, and will permit the filler 12 to automatically spread and seal the connection between the cover and box body as already described. (See Fig. 4.)

In Fig. 5 is shown a grooved bottom wall or rim 7 of a cover 5, containing a filler of bituminous or asphaltic material 12 in a normally plastic adhesive condition, as last-above described in connection with Fig. 4, but with a modified form of covering 16, of paper, or other suitable fibrous or similar sheet material, covering the outer surface of the filler 12 and adhesively secured in engagement with the walls of the groove, said covering of sheet material 16, being sufficiently strong to retain the filler within and in adhesive engagement with the walls of the groove, and sufficiently fragile to be automatically broken, and to permit the spreading of the filler and sealing material 12 in adhesive hermetically sealed engagement with the recessed and flanged marginal portion of the cover and the flanged upper rim of the box body when the cover is in place and the vault is closed.

From the foregoing it will be readily understood that by having the bottom recess or groove 8 and the plastic material in the flanged cover, and the upwardly projecting flange or tongue 9 on the upper margin or rim of the box-body, the normally plastic adhesive material or cement contained in said groove or recess will be shielded and protected when the cover is off, and also during the operation of lowering and placing the cover upon and in position to close the vault. Since the recess opens downwardly no traps or pockets will be formed in which pebbles and foreign particles of material such as may interfere with the proper sealing of the vault can collect.

To provide limiting stops for limiting the downward movement of the cover the wall 2 of the box is thicker than the base of the tongue so that substantially horizontal surface portions 17 are formed at both sides of the tongue, either one or both of which may function as a limiting stop and in accordance with my invention the area of one surface portion 17 is reduced at least about the outside of the tongue 9 to the minimum required for stops and so that the area upon which pebbles and foreign materials may collect is reduced to a minimum. This is accomplished by varying the contour of the surface 17 interruptedly or by chamfering or beveling the outer margin of the top rim of the box-body, so as to provide an upper marginal surface portion or series of beveled marginal surface portions 18 which extend downward and outward at an incline outside of the flange 9 and from the base of said flange to the outer face of the upright wall of the box-body beneath the outer flange 11 of the cover on all sides of the cover. And marginal shoulders 19 are formed on and integral with the upper beveled margin or rim of the box-body. Said shoulders project outward from the upper extremity of the beveled surface portions 18 and beneath the outer depending flange 11 of the cover, for limiting the downward movement of the cover relatively to the box-body, particularly during the operation of lowering the cover into position to close the vault.

Any foreign substances which may fall upon the upper flanged rim of the box-body will thus be thrown off or permitted to escape from between the marginal flange of the cover and the rim of the box-body or vault.

In operation, the cover, having the bottom marginal cement-containing groove normally open downward on the under side of the cover, is placed over the box-body member and its contents, with said bottom cement-containing groove of the cover in position to receive the upwardly projecting marginal tongue or flange on the upper rim of the box-body within said groove, and upon the entry of the tongue 9 into the groove and the application of the weight of the cover the plastic sealing material is squeezed from the groove and molded about the tongue 9 due to the applied weight of the cover and until the limit stops formed of the surface 17 prevent further downward movement of the cover at which time the tongue and groove portions of the box and the cover are separated only by a thin film of the sealing material which is intimately engaged with the surfaces of both and forms a water proof seal.

As above mentioned the beveled marginal portions 18 of the surface 17 cooperate with the adjacent surface portions of the cover to form gradually expanding discharge channels or openings and it will be noted that any particles of material resting upon the limit stops, formed adjacent the tongue 9 as above described, will be washed into these channels as an incident to the flow of the sealing material from the groove and into said discharge channels and thereby dislodged from obstructing positions or eliminated.

I claim:

1. In a vault, the combination of a box-body, a cover having a bottom recess on its under side adapted to contain cement for securing the cover in hermetically sealed engagement with the box-body, a depending marginal flange on said cover and forming an outer side wall of said recess, and an upwardly projecting marginal flange on the upper rim of the box-body and adapted to extend into said recess and inside of and in lapped relation to the depending marginal flange on the cover, said box-body having a beveled marginal surface portion extending downward and outward at an incline beneath said depending marginal flange on said cover and adapted to permit the escape of foreign substances from between the margins of the cover and box-body.

2. In a vault, the combination of a cover having a bottom recess on its under side adapted to contain cement for securing the cover in hermetically sealed engagement with the box-body, a depending marginal flange on said cover and forming side walls of said recess, a box-body having an upwardly projecting marginal flange adapted to extend into said recess and inside of and in lapped relation to said depending marginal flange on said cover, said box-body having a beveled upper marginal surface portion extending downward and outward at an incline beneath said marginal flange on said cover, and marginal shoulders on the rim of the box-body and projecting beneath the bottom margin of said depending marginal flange on said cover, for limiting the downward movement of the cover relatively to the top margin of the box-body.

3. In a vault, the combination of a box-body, a cover having a bottom recess on its under side adapted to contain cement for securing the cover in hermetically sealed engagement with the box-body, a depending marginal flange on said cover and forming an outer side wall of said recess, and an upwardly projecting marginal flange on the upper rim of the box-body and adapted to extend into said recess and inside of and in lapped relation to the depending marginal flange on the cover, said box-body having a marginal surface portion extending away from the base of the upwardly projecting marginal flange thereon formed to cooperate with the bottom of the depending marginal flange on said cover to form alternately disposed limit stops for limiting relative movement of said cover and gradually expanding discharge channels into which the cement carried by said cover may flow upon assembly as and for the purpose described.

WILBERT W. HAASE.